May 13, 1924.
G. H. REIMER
AUTOMOBILE GLARE SHIELD
Filed May 18, 1923
1,493,767
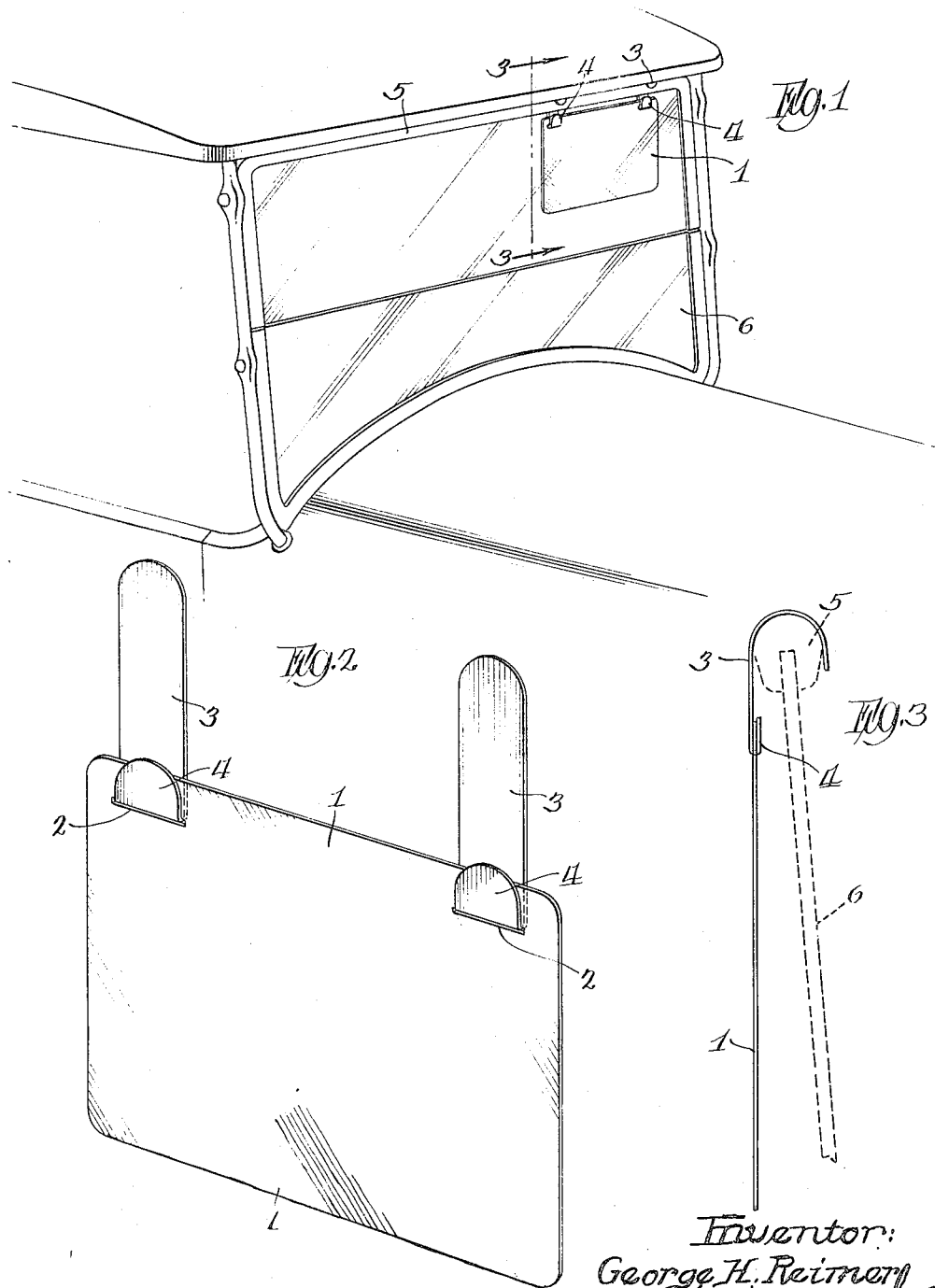

Patented May 13, 1924.

1,493,767

UNITED STATES PATENT OFFICE.

GEORGE H. REIMER, OF FULTON, ILLINOIS, ASSIGNOR TO PATENT NOVELTY COMPANY, OF FULTON, ILLINOIS, A CORPORATION OF ILLINOIS.

AUTOMOBILE GLARE SHIELD.

Application filed May 18, 1923. Serial No. 639,733.

*To all whom it may concern:*

Be it known that I, GEORGE H. REIMER, a citizen of the United States, and resident of Fulton, Whiteside County, Illinois, have invented a certain new and useful Improvement in Automobile Glare Shields, of which the following is a specification.

This invention relates to glare shields for automobiles, and more particularly to those which are hung on the windshields of automobiles, thereby to protect the eyes of the driver from the glare of headlights on other cars or vehicles.

Generally stated, the object of the invention is to provide a glare shield having an extremely simple and inexpensive construction of such character that the device may be manufactured and sold practically at minimum cost, and whereby the device may be mailed in an envelope without danger of any breakage thereof, the entire thing when thus mailed being flat and flexible, and being of minimum weight, practically, so that the postage thereon is reduced.

It is also an object to provide certain details of construction tending to increase the general efficiency and the desirability of a glare shield of this particular character.

To these and other useful ends, the invention consists in the matters hereinafter set forth and claimed and shown in the accompanying drawings, in which,—

Fig. 1 is a perspective of an automobile windshield having a glare shield embodying the principles of the invention.

Fig. 2 is a perspective, on a larger scale, of the said glare shield.

Fig. 3 is a vertical section, on a larger scale, on line 3—3 in Fig. 1.

As thus illustrated, the invention comprises a rectangular section 1 of translucent sheet material, such as green celluloid, provided with horizontal slots 2 adjacent the upper corners thereof. Strips of flat sheet metal 3 are inserted through said slots, and the lower end portions 4 of these metal strips are then doubled back and bent upward against the opposite surface of the shield formed by the body or section 1 of translucent and flexible sheet material. In this condition the glare shield is entirely flat and flexible, and can be mailed like a piece of paper in an envelope. The sheet material 1 is flexible and resilient, so that it will resume its flat shape after being flexed. The sheet metal 3 is flexible but not resilient, so that after being flexed, at least to the extent necessary to attach the device to the windshield, the metal will retain the hook-like shape necessary to hang the glare shield on the upper edge of the windshield.

In use, therefore, the portions 3 are bent over the upper edge portion 5 of the windshield 6, as shown in Fig. 3, and the strips 3 retain this hook-like shape to hold the glare shield in place. The glare shield can be pushed to the right or the left, on the upper edge of the windshield, in order to assume the desired position.

The strips 3 can be straightened out flat again if necessary or desirable. These strips can be furnished separately, to the purchaser or user, if necessary or desirable, and the user can then insert the ends of the strips through the slots 2, and can then bend the strips in the manner shown to hold them in place in said slots.

What I claim as my invention is:

1. In a glare shield, a flat section of flexible and resilient translucent sheet material, having its edges exposed, and free to flex everywhere, with slots formed therein near the upper edge thereof, and sheet metal attaching devices inserted in said slots and bent back upon the shield, to hold them in place, and having their projecting portions adapted to be engaged with a support, these projecting portions being flat and of non-resilient sheet metal which can be bent into hook form, whereby the entire shield is made flat for mailing in an envelope, and said resilient material forming the only connection between said attaching devices.

2. A structure as specified in claim 1, said shield thus comprising only three pieces having said slots arranged in line, so that said devices are parallel and extend substantially in the plane of said resilient material.

3. A structure as specified in claim 1, said resilient material being rectangular in shape, with said devices disposed near each upper corner thereof, so that the shield is flexible between said devices.

4. A flexible glare shield for windshields, embodying a flat and frameless sheet of flexible and resilient translucent material having attached to one edge a pair of spaced and separately formed thin flat metal attaching tabs extending upward substantially in the plane of the sheet and being spaced apart and constructed of malleable or soft metal to thereby permit the device to be mailed flat and whereby the user, by means of his fingers alone, is enabled to bend each tab into the desired hook form for engagement with the edge of the windshield that is to serve as a support for the glare shield, said sheet forming the only connecting medium between said tabs, said sheet of translucent material being flexible so that it may bend in an envelope while being transmitted through the mails, but being resilient in order that it may return to its normal flat condition, when bent out of shape, and said attaching means being flexible to permit bending thereof into the desired shape for attachment to said support, said attaching means being non-resilient to enable it to retain its shape when distorted in the desired manner, and to permit folding over of the tabs upon the sheet when inserted in said slots, whereby said shield comprises only three pieces, the sheet having two slots for said tabs.

5. A flexible glare shield for windshields, constructed in a manner to permit mailing in a flat condition in an ordinary envelope, embodying a flat and frameless sheet of flexible and resilient translucent material having projecting from one edge thereof a straight attaching member extending substantially in the plane of the sheet and formed of material which can be easily bent over a support without tools and that will inherently retain the shape into which it is bent, said sheet of translucent material having a slot for said attaching member and being flexible so that it may bend in an envelope while being transmitted through the mails but being resilient in order that it may return to its normal condition, when bent out of shape, and said attaching means being flexible to permit bending thereof into the desired shape for attachment to said support, said attaching means being non-resilient to enable it to retain its shape when distorted in the desired manner, and whereby to permit insertion of the attaching means in said slot and folding over thereof upon the slot.

GEORGE H. REIMER.